(12) United States Patent
Serghine et al.

(10) Patent No.: US 11,891,907 B2
(45) Date of Patent: Feb. 6, 2024

(54) TURBOGENERATOR FOR AIRCRAFT, COMPRISING AN IMPROVED OIL SYSTEM

(71) Applicants: SAFRAN HELICOPTER ENGINES, Bordes (FR); SAFRAN POWER UNITS, Toulouse (FR)

(72) Inventors: Camel Serghine, Moissy-Cramayel (FR); Denis Antoine Julien Real, Moissy-Cramayel (FR)

(73) Assignees: SAFRAN HELICOPTER ENGINES, Bordes (FR); SAFRAN POWER UNITS, Toulouse (FR)

( * ) Notice: Subject to any disclaimer, the term of this patent is extended or adjusted under 35 U.S.C. 154(b) by 68 days.

(21) Appl. No.: 17/757,529

(22) PCT Filed: Dec. 18, 2020

(86) PCT No.: PCT/FR2020/052522
§ 371 (c)(1),
(2) Date: Jun. 16, 2022

(87) PCT Pub. No.: WO2021/123657
PCT Pub. Date: Jun. 24, 2021

(65) Prior Publication Data
US 2023/0026754 A1    Jan. 26, 2023

(30) Foreign Application Priority Data
Dec. 20, 2019 (FR) .................................... 1915265

(51) Int. Cl.
*F01D 25/18* (2006.01)
*F01D 15/10* (2006.01)
(Continued)

(52) U.S. Cl.
CPC ............ *F01D 25/18* (2013.01); *B64D 27/10* (2013.01); *B64D 27/24* (2013.01); *F01D 15/10* (2013.01);
(Continued)

(58) Field of Classification Search
CPC ......... F01D 25/18; F01D 15/10; B64D 27/10; B64D 27/24; B64D 2027/026;
(Continued)

(56) References Cited

U.S. PATENT DOCUMENTS

2015/0311770 A1* 10/2015 Goi .................... H02K 7/1823
290/46
2019/0195091 A1    6/2019 Uhkoetter et al.

FOREIGN PATENT DOCUMENTS

| FR | 1264170 | * | 7/1960 | ............ B01D 45/08 |
| FR | 1264170 A | | 6/1961 | |
| WO | 2018/051080 A1 | | 3/2018 | |

OTHER PUBLICATIONS

International Search Report received for PCT Patent Application No. PCT/FR2020/052522, dated Apr. 23, 2021, 5 pages (2 pages of English Translation and 3 pages of Original Document).

* cited by examiner

*Primary Examiner* — Joseph Ortega
(74) *Attorney, Agent, or Firm* — WOMBLE BOND DICKINSON (US) LLP

(57) ABSTRACT

A turbogenerator (1) for an aircraft (2) comprising: a turboshaft engine (3); an electric generator (4) comprising a rotor (5) driven mechanically by the turboshaft engine (3) and a stator (6) supported by a housing (7) of the electric generator (4); characterized in that the turbogenerator (1) comprises a static separator (8) for separating an air/oil mixture coming from the turboshaft engine (3), the static
(Continued)

separator (8) being positioned around the housing (7) of the electric generator (4).

11 Claims, 4 Drawing Sheets

(51) Int. Cl.
    *B64D 27/10*     (2006.01)
    *B64D 27/24*     (2006.01)
    *B64D 27/02*     (2006.01)

(52) U.S. Cl.
    CPC .. *B64D 2027/026* (2013.01); *F05D 2220/323* (2013.01); *F05D 2220/76* (2013.01); *F05D 2260/609* (2013.01)

(58) Field of Classification Search
    CPC ........... F05D 2220/323; F05D 2220/76; F05D 2260/609; B01D 45/08; Y02T 50/60; F02C 7/06
    See application file for complete search history.

[Fig. 1]
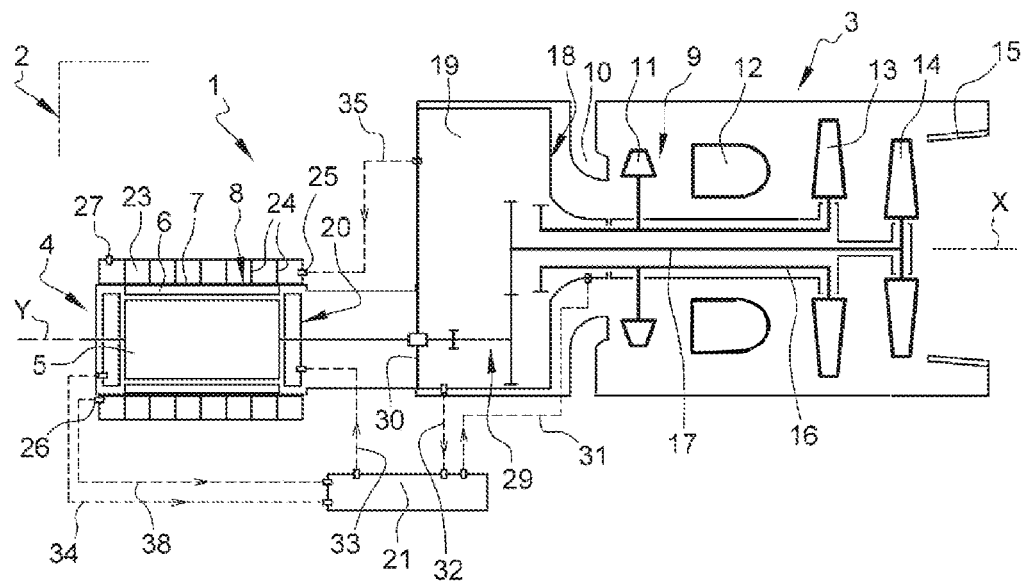
[Fig. 2]
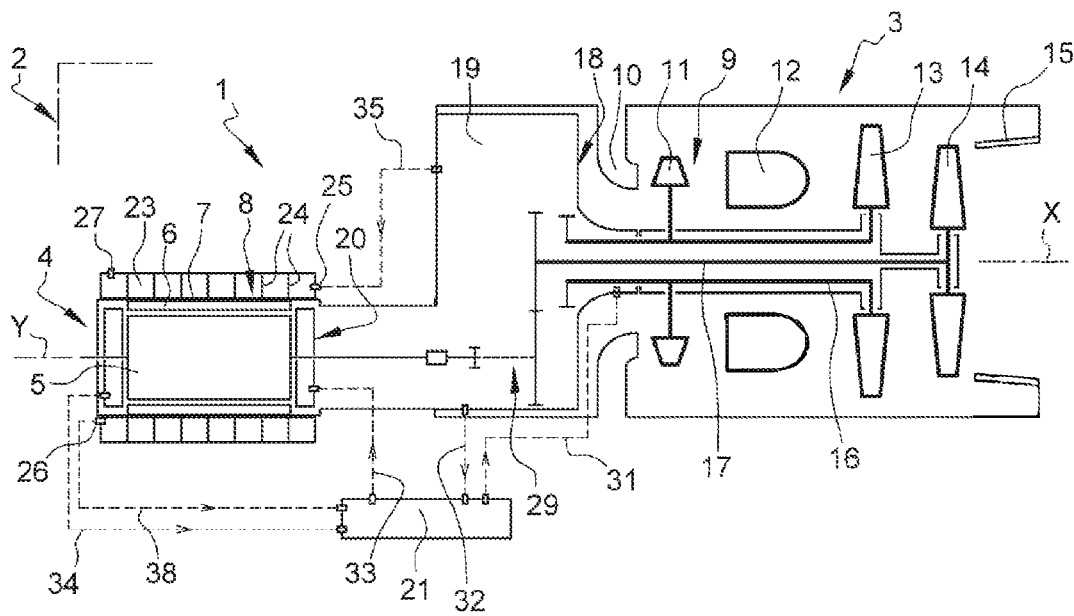

[Fig. 3]
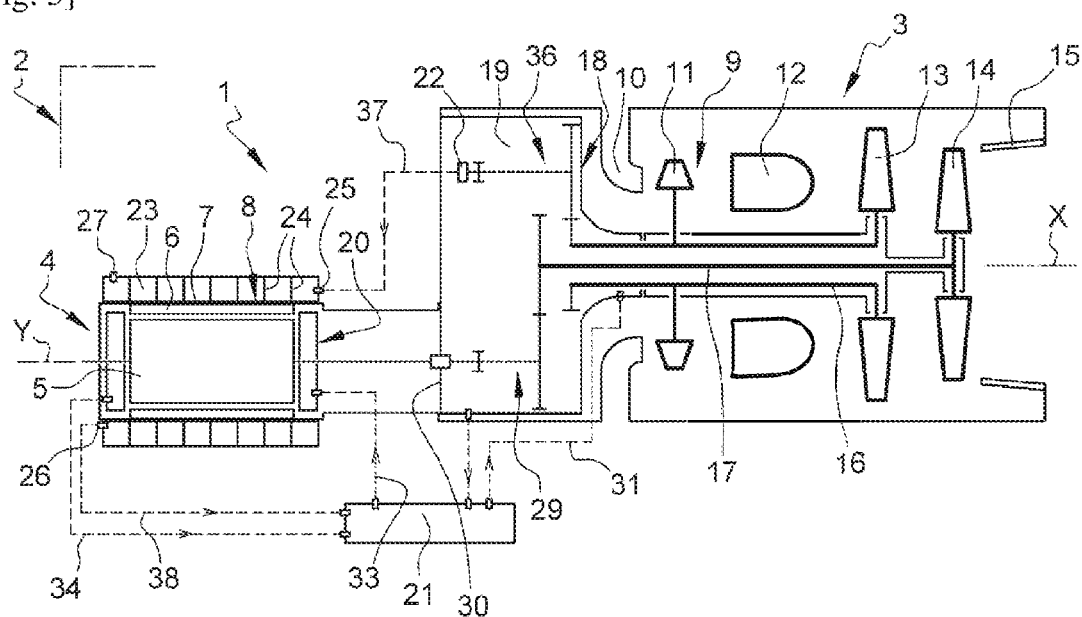
[Fig. 4]
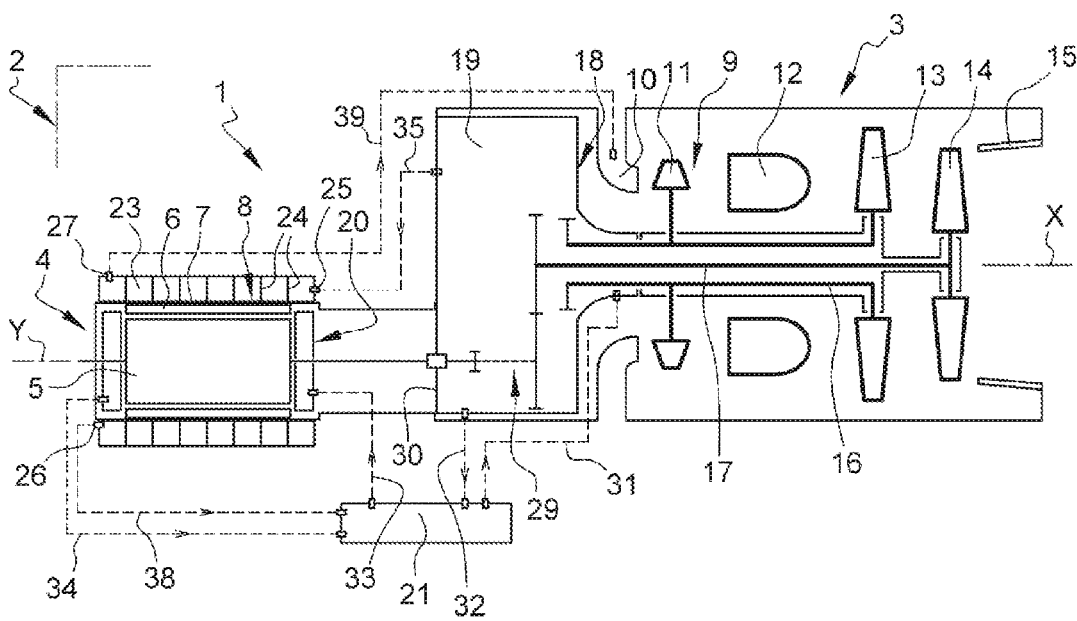

[Fig. 5]
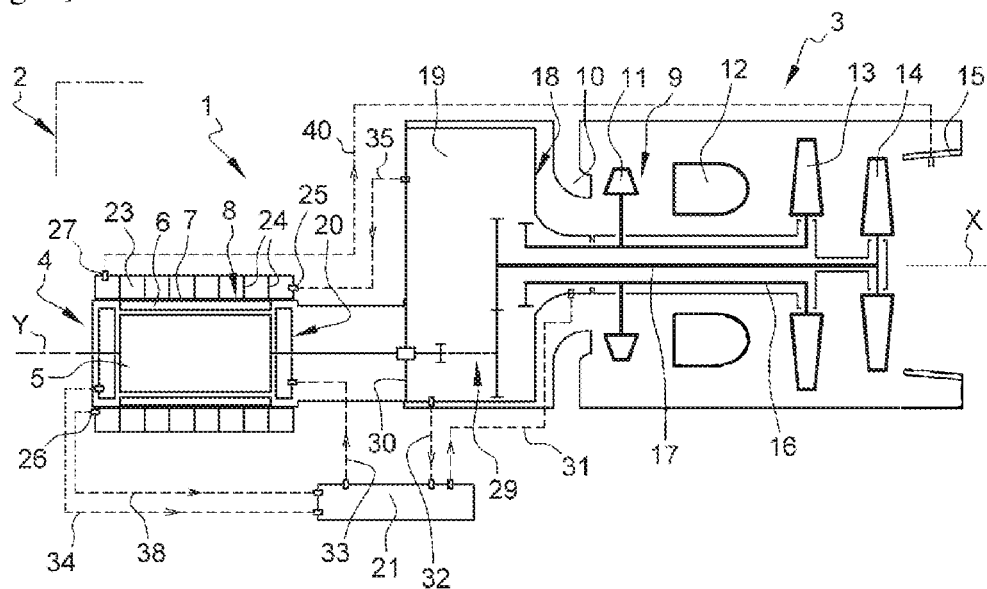
[Fig. 6]
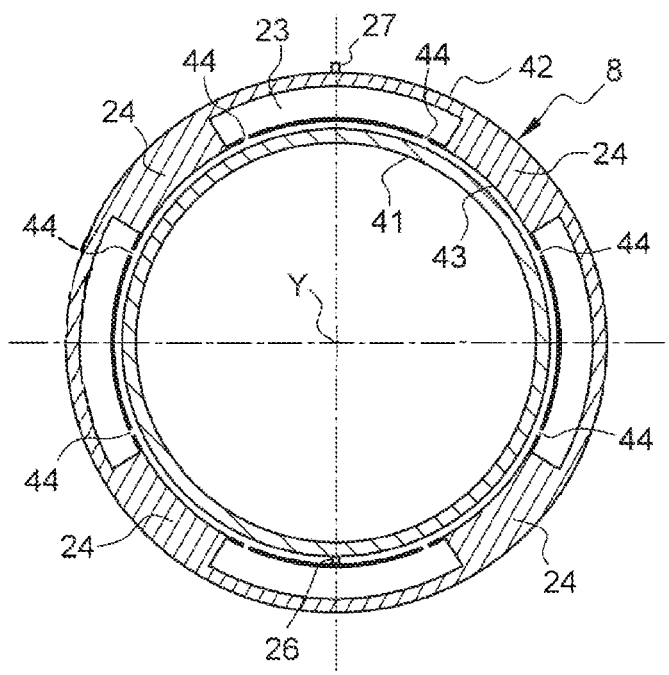

[Fig. 7]
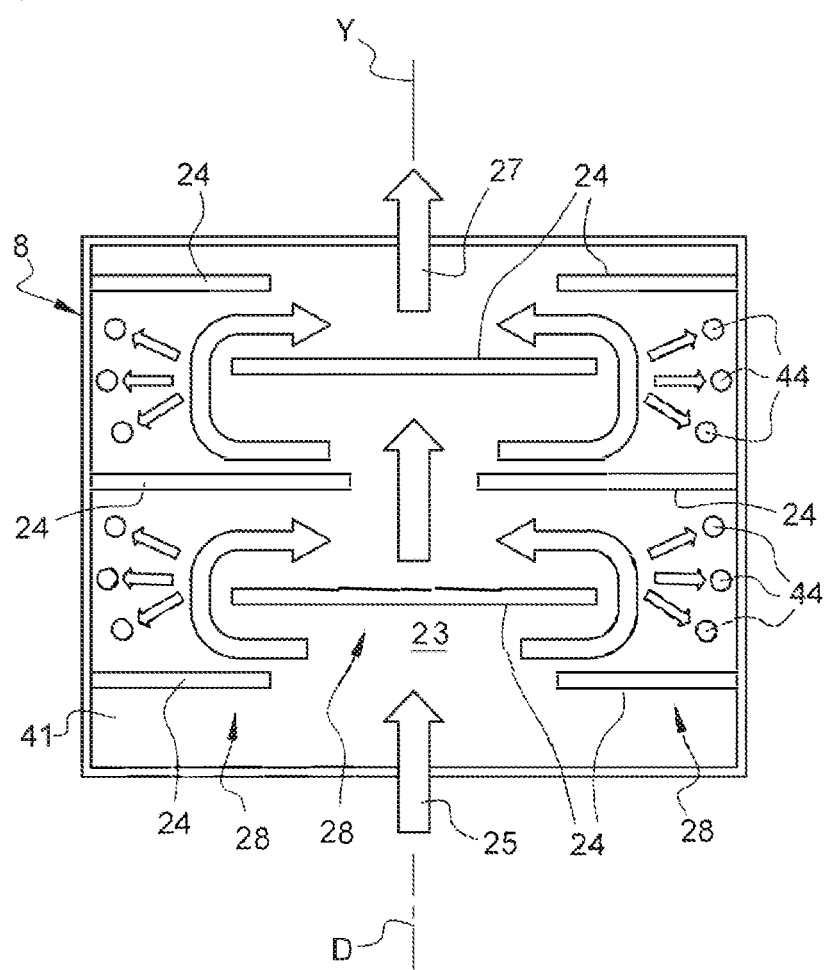

TURBOGENERATOR FOR AIRCRAFT, COMPRISING AN IMPROVED OIL SYSTEM

TECHNICAL FIELD OF THE INVENTION

The present invention relates to a turbogenerator for an aircraft.

TECHNICAL BACKGROUND

A hybrid electric aircraft is for example propelled by several electrical thrusters each comprising a propeller driven by an electric actuator (e.g. an electric motor).

Depending on the different phases of flight, each electric motor can be fed by a turbogenerator and/or by batteries.

The turbogenerator can also be used to recharge the batteries.

A turbogenerator comprises a turboshaft engine and at least one electric generator, the electric generator transforming the mechanical power generated by the turboshaft engine into an electrical power intended for feeding the thrusters or for being stored within the batteries.

Classically, the turboshaft engine comprises a primary circuit in which a flow of air is compressed and then mixed with a fuel before being burned, the resulting exhaust gases being used to drive various turbines. The turboshaft engine also comprises a secondary circuit in which in particular the air and the oil circulate, used mainly to cool, seal and lubricate the turboshaft engine. The air and the oil are injected into the secondary circuit at different locations as required.

The secondary circuit generally comprises an enclosure arranged upstream of the turboshaft engine in which most of the air is collected, the air in this enclosure being charged with oil.

In order to regulate the pressure in the enclosure while limiting the oil losses, it is known to expel air via a kinetic or dynamic decanter (e.g. a centrifugal decanter) placed in the enclosure, the function of which is to separate the oil and the air. At the outlet of the decanter, the separated (or isolated) oil is stored in a reservoir and the de-oiled air is injected into the exhaust nozzle of the turboshaft engine, for example.

Such a kinetic decanter is not entirely satisfactory. Indeed, the engine manufacturers note that the de-oiled air at the outlet of the decanter contains a significant quantity of oil. These oil losses require regular maintenance operations to ensure that the various reservoirs are filled with oil. The engine manufacturers are looking for ways to increase the efficiency of the decantation within the decanter so as to extend the time interval between two maintenance operations. It is worth remembering that the overall dimension available in the enclosure to install a decanter is reduced, and that it is also essential to optimize the overall mass of the turbogenerator.

The objective of the present invention is therefore to provide a simple, effective and economical solution to the above-mentioned problems.

SUMMARY OF THE INVENTION

The invention thus proposes a turbogenerator for an aircraft comprising:
a turboshaft engine;
an electric generator comprising a rotor driven mechanically by the turboshaft engine and a stator supported by a casing of the electric generator;
characterised in that the turbogenerator comprises a static decanter of an air/oil mixture coming from the turboshaft engine, the static decanter being positioned around the casing of the electric generator.

Such a static decanter presents satisfactory performances, and in particular an excellent ratio of decanting quality to overall dimension.

The unused space on the circumference of the electric generator is used to install a static decanter. In particular, the large space available around the casing (compared to the space available in the enclosure of the secondary circuit) allows the installation of a static decanter with optimized dimensions and consequently increases the quality of the decantation. Thus, in general, such a positioning of the electric generator allows to lengthen the time interval between two maintenance operations.

The positioning of the static decanter also allows it to participate in the cooling of the rotor and of the stator of the electric generator. The need for additional cooling, e.g. by means of an oil cooling circuit, is thus limited.

The turbogenerator according to the invention may comprise one or more of the following characteristics and/or steps, taken alone or in combination with each other:
at least one wall of the static decanter is formed by the casing of the electric generator;
the static decanter comprises:
  a decantation chamber for the air/oil mixture;
  a plurality of baffles placed in the chamber;
  an inlet configured to introduce the air/oil mixture into the chamber;
  a first outlet configured to evacuate the oil separated from the air/oil mixture;
  a second outlet configured to evacuate the de-oiled air from the air/oil mixture;
the static decanter is fitted to the casing or the static decanter is integrally formed with the casing;
the decantation chamber is annular and radially delimited by an internal wall and an external wall which are coaxial, each of the baffles radially connecting the internal and external walls;
the static decanter comprises a first row of baffles and a second row of baffles adjacent to the first row, the baffles of the first row being offset relative to the baffles of the second row;
the oil separated from the air/oil mixture is stored in a reservoir of the turbogenerator by gravity or by means of a pump;
the de-oiled air from the air/oil mixture is either discharged outside the turbogenerator or injected into an air inlet of the turboshaft engine or into an exhaust nozzle of the turboshaft engine;
the turboshaft engine comprises a kinetic decanter, the air/oil mixture coming from the kinetic decanter of the turboshaft engine;
the electric generator comprises a cooling and lubrication circuit fed with oil coming from said reservoir of the turbogenerator, and in that said reservoir forms a common reservoir for the electric generator and the turboshaft engine.

The present invention further relates to an aircraft comprising a turbogenerator as previously described.

BRIEF DESCRIPTION OF THE FIGURES

The invention will be better understood and other details, characteristics and advantages of the present invention will become clearer from the following description made by way of non-limiting example and with reference to the attached drawings, in which:

FIG. 1 is a schematic view of a turbogenerator according to a first embodiment of the invention;

FIG. 2 is a schematic view of a turbogenerator according to a second embodiment of the invention;

FIG. 3 is a schematic view of a turbogenerator according to a third embodiment of the invention;

FIG. 4 is a schematic view of a turbogenerator according to a fourth embodiment of the invention;

FIG. 5 is a schematic view of a turbogenerator according to a fifth embodiment of the invention;

FIG. 6 is a schematic cross-sectional view of a static decanter of the turbogenerators shown in FIGS. 1 to 5;

FIG. 7 is a schematic top view unrolled (or laid out) of the decanter shown in FIGS. 1 to 6.

DETAILED DESCRIPTION OF THE INVENTION

FIGS. 1 to 5 show schematically a turbogenerator 1 for an aircraft 2. The aircraft 2 is for example an airplane, a helicopter or a drone.

By convention, in this application, the elements/components with the same numerical references in different figures correspond to identical elements/components.

The turbogenerator 1 comprises a turboshaft engine 3 and at least one electric generator 4 comprising a rotor 5 driven mechanically by the turboshaft engine 3 and a stator 6 supported by a casing 7 (or carcass) of the electric generator 4. The turbogenerator could comprise several electric generators.

According to the invention, the turbogenerator 1 comprises a static decanter 8 for an air/oil mixture from the turboshaft engine 3, the static decanter 8 being positioned around the casing 7 of the electric generator 4.

According to the embodiments illustrated in FIGS. 1 to 5, the turboshaft engine 3 comprises a primary circuit 9 comprising from upstream to downstream (in the direction of flow of the gases) an air inlet 10, at least one compressor 11, a combustion chamber 12, at least one expansion turbine 13, at least one free power transmission turbine 14 and an exhaust nozzle 15.

The compressor or the compressors 11, the combustion chamber 12 and the expansion turbine or turbines 13 form a gas generator.

The rotors of the compressor 11 and the expansion turbine 13 are connected by a drive shaft 16.

The free turbine rotor 14 is connected to an output shaft 17, the output shaft 17 being generally coaxial with and arranged within the drive shaft 16, but it may also be non-coaxial parallel.

The turboshaft engine 3 is defined along an axis X which corresponds to the axis of rotation of the drive and output shafts 16, 17.

Alternatively, the primary circuit of the turboshaft engine could comprise an air inlet, at least one compressor, a combustion chamber, at least one expansion turbine, and an exhaust nozzle. In other words, such a turboshaft engine would not comprise a free turbine and would comprise a single drive shaft connecting the rotors of the compressor and of the expansion turbine.

The electric generator 4 transforms the mechanical power generated by the turboshaft engine 3 into an electrical power. The electrical power is for example intended to feed electrical actuators of the thrusters of the aircraft or to be stored in batteries.

The rotor 5 of the electric generator 4 is driven mechanically by the turboshaft engine 3. More specifically, the rotor 5 of the electric generator 4 can be driven directly or indirectly by the drive shaft 16 or the output shaft 17 of the turboshaft engine 3.

The electric generator 4 is defined along an axis Y which corresponds to the rotation axis of the rotor 5.

By convention, in this application, the terms "upstream" and "downstream" are defined with respect to the direction of flow of the gases in the primary circuit 9 of the turboshaft engine 3.

"Axial" or "axially" means any direction parallel to the axis X of the turboshaft engine 3 or the axis Y of the electric generator 4, and "radial" or "radially" means any direction perpendicular to the axis X of the turboshaft engine 3 or the axis Y of the electric generator 4.

Similarly, by convention in this application, the terms "internal" and "external" associated with the turboshaft engine 3 are defined radially with respect to the axis X of the turboshaft engine 3, and the terms "internal" and "external" associated with the electric generator 4 are defined radially with respect to the axis Y of the electric generator 4.

The turboshaft engine 3 further comprises a secondary circuit 18 through which circulate the air and the oil used primarily to cool, seal and lubricate the turboshaft engine 3. The air and the oil are injected into the secondary circuit 18 at different locations as required. The secondary circuit 18 comprises an enclosure 19 arranged upstream of the turboshaft engine 3 in which most of the air is collected, the air in this enclosure 19 being charged with oil. More precisely, the enclosure 19 is arranged upstream of the gas generator, in other words upstream of the air inlet 10 of the turboshaft engine 3. The air/oil mixture decanted by the static decanter 8 can come from the enclosure 19 of the secondary circuit 18, or more generally from the secondary circuit 18.

The electric generator 4 may comprise a cooling circuit separate from the secondary circuit 18 of the turboshaft engine 3 in which a cooling fluid (liquid or gas) circulates. The fluid circulating in the cooling circuit of the electric generator 4 can be oil, or air de-oiled by the static decanter 8, or another heat transfer fluid.

The electric generator 4 may comprise a cooling and lubrication circuit 20 in which oil is circulated. The cooling and lubrication circuit 20 allows in particular to cool the rotor and the stator of the electric generator, but also to lubricate bearings guiding the rotor and dynamic seals.

As indicated above, according to the invention, the turbogenerator 1 comprises a static decanter 8 of an air/oil mixture from the turboshaft engine 3, the static decanter 8 being positioned around or on the circumference of the casing 7. The static decanter 8 (or static separator) allows to treat the air/oil mixture by separating the oil and the air. The decanter is referred to as "static" since all the components forming the decanter are static or stationary in the reference frame of the turbogenerator.

The static decanter 8 can be fitted, in part or in whole, directly or indirectly, to the casing 7. In such a configuration, the static decanter can be disassembled independently of the casing, which facilitates in particular a maintenance or repair operation on the static decanter.

The static decanter 8 can also be partially or completely integrally formed with the casing 7.

The static decanter 8 may comprise a portion (e.g. a wall) formed by the casing 7 of the electric generator 4.

The static decanter alone or combined with the casing can be obtained by additive manufacturing (rapid prototyping). Such a method allows to manufacture parts with complex shapes.

The air de-oiled by the static decanter 8 can either be discharged outside the turbogenerator 1 or injected into the air inlet 10 of the turboshaft engine 3 or into the exhaust nozzle 15 of the turboshaft engine 3. When the air/oil mixture decanted by the static decanter 8 comes from the secondary circuit 18 of the turboshaft engine, the evacuation of the de-oiled air allows the pressure in the secondary circuit 18 to be regulated.

The oil separated (or isolated) by the static decanter 8 is stored in a reservoir of the turbogenerator by gravity or by means of a pump.

The turbogenerator 1 may comprise a single oil reservoir 21 common to the turboshaft engine 3 and the electric generator 4. In such a configuration, the oil separated by the static decanter is stored in the single reservoir 21.

The turbogenerator 1 can comprise a first reservoir dedicated to the turboshaft engine 3 and a second reservoir dedicated to the electric generator 4. The first and second reservoirs can be placed side by side or at a distance from each other, so that they can be connected separately to the turboshaft engine 3 and to the electric generator 4. In such a configuration, the oil separated by the static decanter is either stored in the first reservoir and/or the second reservoir.

The turboshaft engine 3 may comprise a kinetic 22 or dynamic decanter. In such a configuration, the air/oil mixture decanted by the static decanter 8 then comes from the kinetic decanter 22 of the turboshaft engine 3. The static decanter 8 thus ensures a second decantation so as to increase the quantity of oil recovered, and in other words minimize the oil losses. A decanter referred to as kinetic comprises at least one movable component, for example a rotatable wheel whose function is to separate the oil and the air under the effect of centrifugal force. A kinetic decanter is for example placed in the enclosure 19 of the secondary circuit 18.

Specifically, the static decanter 8 may comprise:
- a decantation chamber 23 for air/oil mixture;
- a plurality of baffles 24 (or deflectors) placed in the chamber 23;
- an inlet 25 configured to introduce the air/oil mixture into the chamber 23;
- a first outlet 26 configured to evacuate the oil separated (or isolated) from the air/oil mixture;
- a second outlet 27 configured to evacuate the de-oiled air from the air/oil mixture.

The flow of the air/oil mixture is provided by the pressure difference between the inlet 25 and the first and second outlets 26, 27.

The decantation chamber 23 of the static decanter 8 can be compartmentalized.

The baffles 24 of the static decanter 8 allow to disturb the flow of the air/oil mixture, and in other words to modify the direction of flow of the air/oil mixture within the decantation chamber 23. When the air/oil mixture hits a baffle, the oil droplets are retained by adhesion on the baffle while the air continues to flow. It is thus understood that the efficiency of the decantation depends on the importance of the contacts or interactions between the air/oil mixture and the elements arranged inside the static decanter 8 (and in particular the baffles).

The static decanter 8 may comprise one or more rows 28 of baffles 24. When the static decanter 8 comprises several rows 28 of baffles 24, the baffles of two adjacent rows may be offset with respect to each other. The baffles 24 can for example be arranged in a staggered pattern. Each of the baffles 24 may, for example, be in the form of a flat or twisted fin.

The inlet 25 and the first and second outlets 26, 27 of the static decanter 8 may each be, for example, in the form of an end-piece configured to be connected to a complementary end-piece of an element intended to transfer a fluid (e.g., a conduit).

According to the embodiments shown in FIGS. 1 to 5, the turbogenerator 1 comprises a single electric generator 4. As noted above, the turbogenerator could comprise multiple electric generators. The electric generator 4 is fitted to the turboshaft engine 3 at the level of an upstream end of the turboshaft engine 3, the electric generator 4 being attached to the enclosure 19 of the secondary circuit 18 of the turboshaft engine 3. The axis Y of the electric generator 4 is parallel to the axis X of the turboshaft engine 3. The rotor 5 of the electric generator 4 is driven by the output shaft 17 of the turboshaft engine 3 via a gear train 29.

According to the embodiments shown in FIGS. 1, 3 to 5, the interior space of the electric generator 4 is isolated from the enclosure 19 of the secondary circuit 18 via a sealing partition 30.

According to the embodiment shown in FIG. 2, the interior space of the electric generator 4 communicates with the enclosure 19 of the secondary circuit 18.

According to the embodiments illustrated in FIGS. 1 to 5, the turbogenerator 1 comprises a single oil reservoir 21 common to the turboshaft engine 3 and the electric generator 4. The secondary circuit 18 of the turboshaft engine 3 and the cooling and lubrication circuit 20 of the electric generator 4 are fed with oil from the common reservoir 21.

The secondary circuit 18 of the turboshaft engine 3 is connected to the common reservoir 21 via at least one feed conduit 31 and at least one exhaust conduit 32.

According to the embodiments illustrated in FIGS. 1 to 5, the electric generator 4 comprises a cooling and lubrication circuit 20 in which the oil circulates. The cooling and lubrication circuit 20 of the electric generator 4 is connected to the common reservoir 21 via at least one feed conduit 33 and at least one return conduit 34.

According to the embodiments shown in FIGS. 1 to 5, the static decanter 8 is arranged on the external periphery of the casing 7, the static decanter 8 being directly in contact with the external periphery of the casing 7.

According to the embodiments illustrated in FIGS. 1 to 5, the static decanter 8 more specifically comprises:
- a decantation chamber 23 for the air/oil mixture;
- a plurality of baffles 24 placed in the chamber 23;
- an inlet 25 configured to introduce the air/oil mixture into the chamber 23;
- a first outlet 26 configured to evacuate the oil separated (or isolated) from the air/oil mixture;
- a second outlet 27 configured to evacuate the de-oiled air from the air/oil mixture.

According to the embodiments shown in FIGS. 1, 2, 4 to 5, the inlet 25 of the static decanter 8 is connected to the enclosure 19 of the secondary circuit 18 via a feed conduit 35. The air/oil mixture decanted by the static decanter 8 thus comes from the enclosure 19 of the secondary circuit 18.

According to the embodiment shown in FIG. 3, the turboshaft engine 3 comprises a kinetic decanter comprising a movable component driven by the drive shaft 16 via a gear train 36. The kinetic decanter is arranged in the enclosure 19 of the secondary circuit 18. The inlet 25 of the static decanter 8 is connected to an outlet of the kinetic decanter via a feed conduit 37. The air/oil mixture decanted by the static decanter 8 thus comes from the kinetic decanter of the turboshaft engine 3.

According to the embodiments shown in FIGS. 1 to 5, the first outlet 26 of the static decanter 8 is connected to the common oil reservoir 21 via an exhaust conduit 38. The oil separated by the static decanter 8 is thus stored in the common oil reservoir 21.

According to the embodiment shown in FIG. 4, the second outlet 27 of the static decanter 8 is connected to the air inlet 10 of the turboshaft engine 3 via an exhaust conduit 39. The air de-oiled by the static decanter 8 is thus injected into the air inlet 10 of the turboshaft engine 3.

According to the embodiment shown in FIG. 5, the second outlet 27 of the static decanter 8 is connected to the exhaust nozzle 15 of the turboshaft engine 3 via an exhaust conduit 40. The air de-oiled by the static decanter 8 is thus injected into the exhaust nozzle 15 of the turboshaft engine 3.

According to the embodiments shown in FIGS. 1 to 5, and more specifically, as shown in FIG. 6, the decantation chamber 23 is annular and radially delimited by an internal wall 41 and an external wall 42 which are coaxial, with each of the baffles 24 radially connecting the internal and external walls 41, 42. The internal wall 41 is formed here by the casing 7.

Nevertheless, according to an alternative not shown, the external wall 42 can be formed by the casing 7, the internal wall 41 then constituting an inner skin of the casing.

The internal wall 41 comprises a separate oil evacuation circuit 43, as well as orifices 44 communicating with both the decantation chamber 23 and the evacuation circuit 43. The oil droplets retained by adherence to the baffles 24 flow to the orifices 44. The evacuation circuit 43 collects and gathers the separated oil. The first outlet 26 communicates with the evacuation circuit 43. Advantageously, the first outlet 26 will be placed at 6 o'clock by analogy with the dial of a clock.

The second outlet 27 of the static decanter 8 is arranged at the level of the external wall 42.

As shown in FIG. 7, the static decanter 8 comprises a plurality of axial rows 28 of baffles 24, in other words rows 28 of baffles 24 extending along the axis Y of the electric generator 4. The baffles 24 are arranged in a staggered pattern and are each in the form of a flat fin connecting the internal and external walls 41, 42. The external wall 42 of the decantation chamber 23 is not shown in FIG. 7.

The air/oil mixture is defined by a flow direction D, each of the baffles 24 being arranged perpendicular to this flow direction D.

The invention claimed is:

1. A turbogenerator for an aircraft comprising:
a turboshaft engine;
an electric generator comprising a rotor driven mechanically by the turboshaft engine and a stator supported by a casing of the electric generator;
wherein the turbogenerator comprises a static decanter of an air/oil mixture coming from the turboshaft engine, the static decanter being positioned around the casing of the electric generator.

2. The turbogenerator according to claim 1, wherein at least one wall of the static decanter is formed by the casing of the electric generator.

3. The turbogenerator according to claim 1, wherein the static decanter comprises:
a decantation chamber for the air/oil mixture;
a plurality of baffles placed in the chamber;
an inlet configured to introduce the air/oil mixture into the chamber;
a first outlet configured to evacuate the oil separated from the air/oil mixture;
a second outlet configured to evacuate the de-oiled air from the air/oil mixture.

4. The turbogenerator according to claim 3, wherein the decantation chamber is annular and radially delimited by an internal wall and an external wall which are coaxial, each of the baffles radially connecting the internal and external walls.

5. The turbogenerator according to claim 3, wherein the static decanter comprises a first row of baffles and a second row of baffles adjacent to the first row, the baffles of the first row being offset relative to the baffles of the second row.

6. The turbogenerator according to claim 3, wherein the oil separated from the air/oil mixture is stored in a reservoir of the turbogenerator by gravity or by means of a pump.

7. The turbogenerator according to claim 6, wherein the electric generator comprises a cooling and lubrication circuit fed with oil coming from said reservoir of the turbogenerator, and in that said reservoir forms a common reservoir for the electric generator and the turboshaft engine.

8. The turbogenerator according to claim 3, wherein the de-oiled air from the air/oil mixture is either discharged outside the turbogenerator or injected into an air inlet of the turboshaft engine or into an exhaust nozzle of the turboshaft engine.

9. The turbogenerator according to claim 1, wherein the static decanter is fitted to the casing or the static decanter is integrally formed with the casing.

10. The turbogenerator according to claim 1, wherein the turboshaft engine comprises a kinetic decanter, the air/oil mixture coming from the kinetic decanter of the turboshaft engine.

11. An aircraft comprising a turbogenerator according to claim 1.

* * * * *